(12) United States Patent
Passaglia et al.

(10) Patent No.: US 9,384,416 B1
(45) Date of Patent: Jul. 5, 2016

(54) QUANTITATIVE IMAGE ANALYSIS APPLIED TO THE GRADING OF VITREOUS HAZE

(71) Applicants: Christopher L. Passaglia, Lutz, FL (US); Brian Madow, Apollo Beach, FL (US); David W. Richards, Tampa, FL (US); Erin L. Greenberg, Port Charlotte, FL (US)

(72) Inventors: Christopher L. Passaglia, Lutz, FL (US); Brian Madow, Apollo Beach, FL (US); David W. Richards, Tampa, FL (US); Erin L. Greenberg, Port Charlotte, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 14/627,759

(22) Filed: Feb. 20, 2015

Related U.S. Application Data (60) Provisional application No. 61/942,404, filed on Feb. 20, 2014.

(51) Int. Cl.
*G06K 9/00* (2006.01)
*G06K 9/52* (2006.01)
*G06T 7/00* (2006.01)

(52) U.S. Cl.
CPC .............. *G06K 9/52* (2013.01); *G06T 7/0012* (2013.01); *G06T 2207/30041* (2013.01)

(58) Field of Classification Search
None
See application file for complete search history.

(56) References Cited

U.S. PATENT DOCUMENTS

| 5,579,063 | A | 11/1996 | Magnante et al. |
| 6,393,157 | B1* | 5/2002 | Miller ................. G06T 7/0081 382/254 |
| 7,703,918 | B2 | 4/2010 | Kolanko et al. |
| 8,491,120 | B2 | 7/2013 | Kahn et al. |
| 2008/0049014 | A1* | 2/2008 | Haimerl ................. A61B 19/52 345/419 |
| 2011/0043756 | A1 | 2/2011 | Kahn et al. |
| 2014/0355902 | A1* | 12/2014 | Olsson ................. H04N 5/21 382/261 |
| 2014/0362970 | A1* | 12/2014 | Launay ................. A61B 6/032 378/4 |

FOREIGN PATENT DOCUMENTS

| WO | 0051080 A1 | 8/2000 |
| WO | 0215818 A2 | 2/2002 |
| WO | 03030073 A1 | 4/2003 |

OTHER PUBLICATIONS

Andrew Hunter, James A. Lowell, Maged Habib, Bob Ryder, Ansu Basu, David Steel, An Automated Retinal Image Quality Grading Algorithm, 33rd Annual International Conference of the IEEE EMBS, Boston, Massachusetts USA, Aug. 30-Sep. 3, 2011, pp. 1-4.

(Continued)

*Primary Examiner* — Bhavesh Mehta
*Assistant Examiner* — Oneal R Mistry
(74) *Attorney, Agent, or Firm* — Nicholas Pfeifer; Smith & Hopen, P.A.

(57) ABSTRACT

The present invention includes an automated method for grading the blurring of ocular fundus images to permit automated grading of severity of vitritis. Standard fundoscopic images are converted to gray-scale images. The gray-scale images are processed through a low-pass filter to eliminate high frequency components. The low pass image is subtracted from the corresponding original image, producing the difference image. The difference image is converted to the final entropy image. The entropy image is processed using Fast Fourier Transform to calculate its power. The final blur score is calculated.

10 Claims, 8 Drawing Sheets
(2 of 8 Drawing Sheet(s) Filed in Color)

(56) References Cited

OTHER PUBLICATIONS

Honggang Yu et al., Automated image quality evaluation of retinal fundus photographs in diabetic retinopathy screening, Image Analysis and Interpretation (SSIAI), 2012 IEEE Southwest Symposium, pp. 125-128.

Shijian Lu, Jiang Liu, Joo Hwee Lim, Zhuo Zhang, Tan Ngan Meng, Wing Kee Wong, Huiqi Li, and Tian Yin Wong, Automatic Fundus Image Classification for Computer-Aided Diagonsis, 31st Annual International Conference of the IEEE EMBS, Minneapolis, Minnesota, USA, Sep. 2-6, 2009, pp. 1453-1456.

Janet L. Davis, Brian Madow, Jessica Cornett, Rick Stratton, Ditte Hess, Vittorio Porciatti, and William J. Feuer, Scale for Photographic Grading of Vitreous Haze in Uveitis, American Journal of Ophthalmology, Nov. 2010, vol. 150, No. 5, pp. 637-641.

* cited by examiner

QUANTITATIVE IMAGE ANALYSIS APPLIED TO THE GRADING OF VITREOUS HAZE

CROSS-REFERENCE TO RELATED APPLICATIONS

This nonprovisional application is a continuation of and claims priority to provisional application No. 61/942,404, entitled "QUANTITATIVE IMAGE ANALYSIS APPLIED TO THE GRADING OF VITREOUS HAZE," filed Feb. 20, 2014 by the same inventor.

BACKGROUND OF THE INVENTION

1. Field of the Invention

This invention relates to an empirically verified method to objectively quantitate the blurriness of ocular fundus images. More specifically, the invention relates to a comparison of multiple methods of image analysis as tested against a standard subjective grading system in order to permit automated grading of the severity of vitritis.

2. Brief Description of the Related Art

Intraocular inflammatory processes lead to progressive accumulation of cells and protein exudate in the vitreous, often referred to as vitreous haze. Vitreous haze serves as a surrogate marker for intraocular inflammation caused by variety of inflammatory diseases known as uveitis. It has been used currently as a primary outcome for clinical trials in uveitis. The amount of vitreous haze can change over the course of the disease and it is expected to decrease or disappear when adequately treated with anti-inflammatory medications. Vitreous haze can be detected by ophthalmoloscopic inspection of the eye as decreased visibility of the retinal vasculature, optic nerve head, and other fundus details. Several photographic scales are currently used in an attempt to standardize clinical grading of vitreous haze. The estimation of the amount of the haze is subjective and changes in condition can be difficult to identify and report because the range of grades is sparse and skewed due to poor discriminability at low levels of haze. In order to standardize the grading of the vitreous haze a clinical photographic scale has been proposed. Recently, a new digital photographic scale comprising of fundus photographs with increasing amount of blur has been introduced by J. Davis, B Madow et. al. (Am. J. Ophthalmology, 2010, 2011). It has been successfully used in the reading center environment to more precisely judge vitreous opacification where the photograph with unknown amount of vitreous haze is judged against a set of standard photos with known amounts of haze. However, since it is subjective, often there is disagreement between multiple graders as to the exact value of the grade. In addition, it takes significant amount of time to perform the grading.

What is needed is a method for grading the blurring of ocular fundus images to permit automated objective grading of severity of vitritis in a more efficient manner. However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for an automated objective grading of the blurring of ocular fundus images is now met by a new, useful, and nonobvious invention.

The novel method includes first obtaining or taking a fundoscopic image. The image is converted into a gray-scale image and the gray-scale image is processed through a low-pass filter to obtain a low-pass image by eliminating high frequency components. A difference image is then created by subtracting the low-pass image from the original image, and the difference image is converted into an entropy image. In a certain embodiment, the conversion is accomplished by applying an entropy filter to the difference image where the entropy filter bandwidth encompasses the range of sizes of retinal blood vessels in fundoscopic images. Finally, the power spectrum of the entropy image is calculated using Fast Fourier Transform and from there the blur score is calculated. In a certain embodiment, the blur score is calculated by averaging a power spectrum along a plurality of image slices.

In a certain embodiment, the power spectrum of the entropy image is integrated over a spatial frequency band (x) that encompasses the range of sizes of retinal blood vessels in the eye, which includes 100-300 microns/cycle. In a certain embodiment, the power integration band (x) corresponds to the range of spatial frequencies of retinal blood vessels in the fundoscopic images, which is 10-50 cycles/image.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims. The invention is not the algorithms of entropy or power spectral analysis, which are familiar to people versed in the art of image processing, but rather the particular collection of algorithms used, the specific order of execution of those algorithms to compute a "blur score", and the empirically-determined parameters used in the calculations to produce blur scores that are comparable to those of expert clinician graders.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The invention includes an automated method applying an algorithm for grading vitreous haze in an unbiased and quantitative manner that correlates strongly with subjective readings of an expert clinician.

Computer algorithms can achieve fast and accurate determination of blur values. Therefore, the invention implements a robust computer algorithm to grade vitreous haze accurately, quickly, and reliably without subjective bias. The algorithm can be used on a computer at the clinical reading center or as a standalone device during the patient examination. The invented employs a combination of image processing techniques including entropy filtering to produce a blur value that correlates well with clinical grading. The invention uses a computer to execute the steps of an algorithm using the pre-defined parameters to compute a blur value and, thereby, quantifying blur of ocular fundus images.

Figure 1:
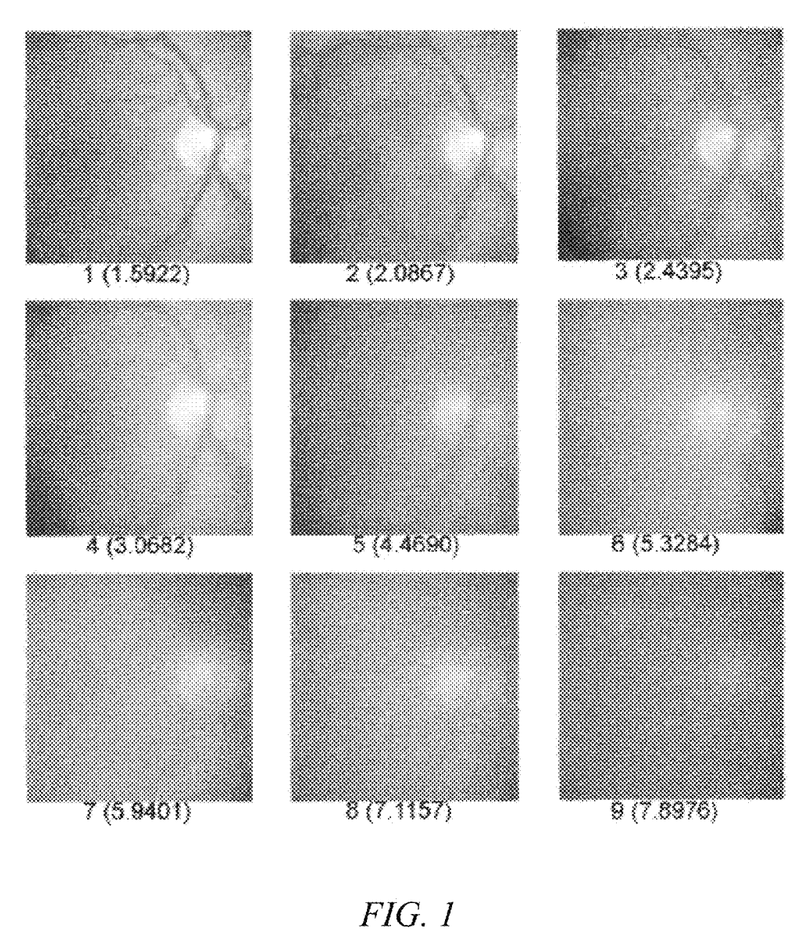
FIG. 1 is a set of nine standard fundoscopic images where images 2-9 were created by passing the original image (1) through a series of analog spatial filters of progressively lower cutoff frequency, which produces increasing amounts of blur (2-9).

Several different image-processing algorithms were written on the MATLAB platform to quantify blurriness, which included entropy-filtering methods. The algorithms were refined and validated using a set of eight reference images that were acquired by optically filtering a single standard fundus picture to varying degrees that simulate increasing vitreous haze. Davis J L, et al., Am. J. Ophthalmol., 2010, 150: 637-641. After reference set validation, the algorithms were applied without modification to a dataset of clinical images.
Example FIG. 1 provides a set of standard fundoscopic images 1-9 created by passing the original image 1 through a series of analog spatial filters, creating increasing degrees of "blur" in images 2-9. The "blur" scores obtained by using the invented method are shown in parentheses below each image in FIG. 1.

Figure 2A:
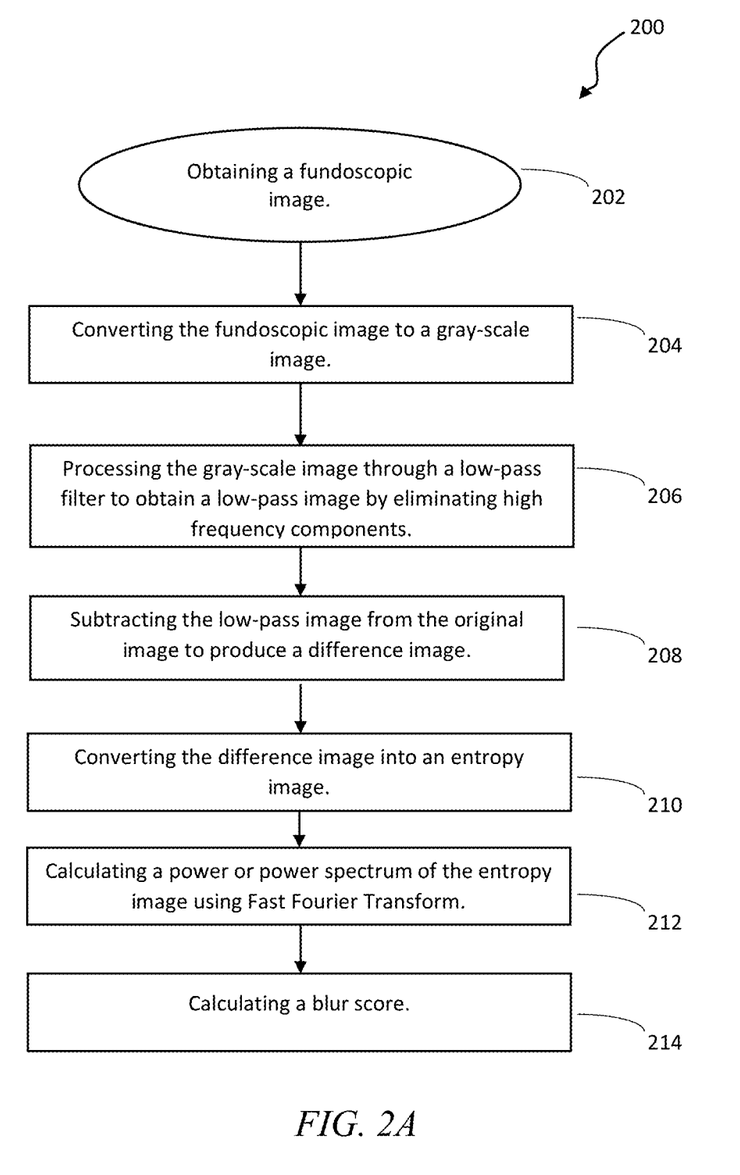
FIG. 2A is a flowchart depicting an embodiment of the present invention.
Figure 2B:
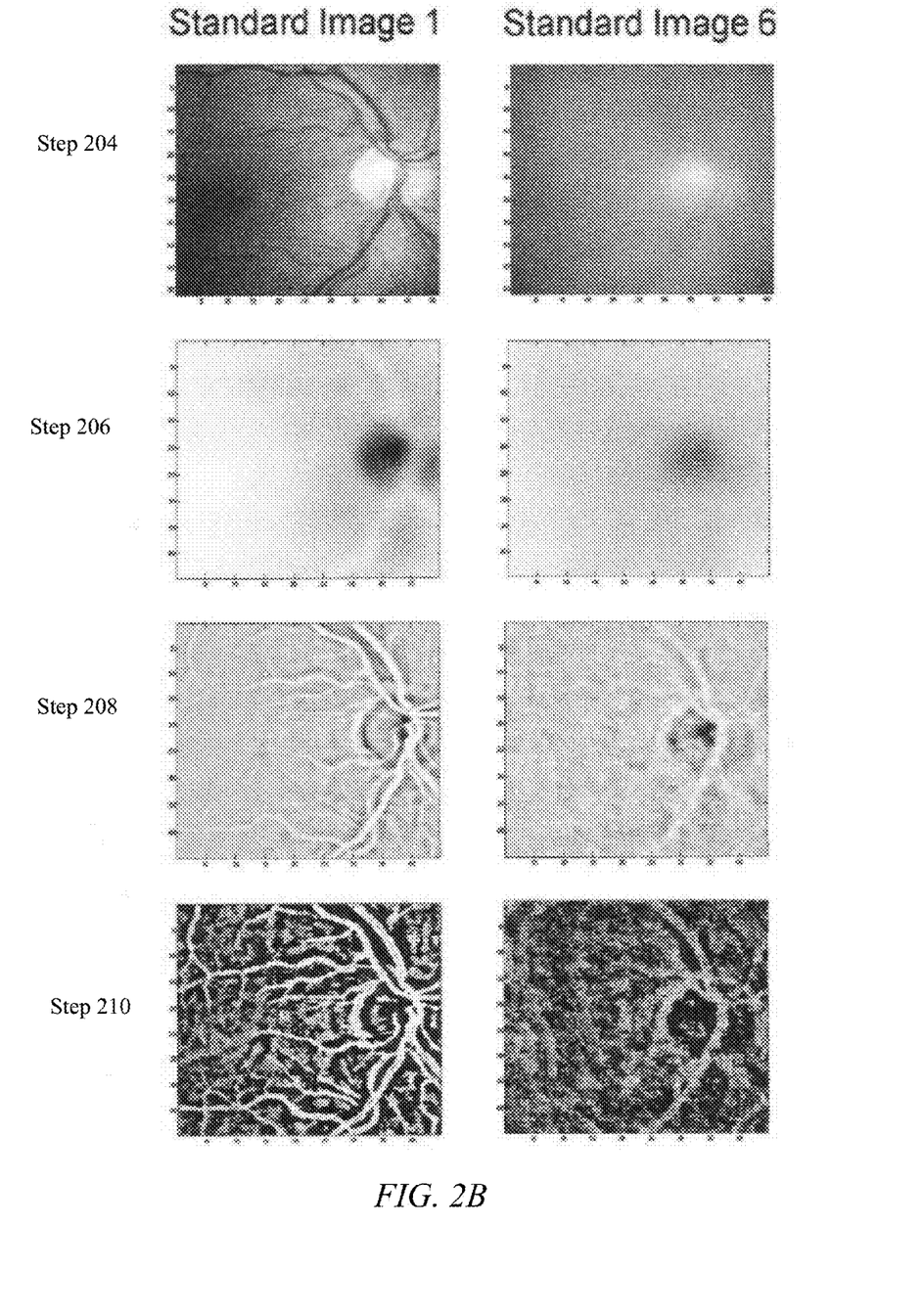
FIG. 2B is a set of entropy images generated from original images 1 and 6 of FIG. 1 through implementation of the first four steps in the method according to FIG. 2A.

The images were processed using a custom designed algorithm, generally denoted by reference numeral 200 and exemplified in FIG. 2A, with the effects on the images shown in FIG. 2B. Images 1 and 6 from FIG. 1 are used as examples for the process shown in FIGS. 2. After obtaining fundoscopic images, step 202, the images are converted to gray-scale in step 204. Next, the images are processed through a low-pass filter in step 206 to eliminate high frequency components. Any low pass filter known to a person having ordinary skill in the art may be used such that the filter eliminates frequency components corresponding to retinal blood vessels so that only the background is passed by the filter. In step 208, the low pass image is subtracted from the original image, producing the difference image. The difference image is converted to the final "entropy image" in step 210. The entropy images with higher frequency correlate with the increased sharpness of the original. Finally, the entropy image is processed using Fast Fourier Transform to calculate its power in step 212. The final "blur score" is calculated using the following equation in step 214:

$$\text{score} = A \bigg/ \sum_{k=1}^{N} \sum_{x=F1}^{F2} P_x(k\theta)$$

where P=power spectrum of entropy image, x=frequency band variable, F1=lowest frequency of interest, F2=highest frequency of interest, k=orientation variable, θ=step in orientation angle, and A=conversion factor to convert score to clinical scale. The orientation stepsize θ was selected arbitrarily as a tradeoff between accuracy and speed. In this particular example, the orientation stepsize was every 15 degrees. A smaller stepsize is possible and one could average over all possible orientations but that would take the program longer. The variable k is a mathematical term representing a given orientation. For example, k=1 corresponds to orientation of 15 degrees, k=2 to 30 degrees, k=3 to 45 degrees, etc. for θ=15 degree spacing, the formula averages over N=20 orientations. The variable x is a mathematical term representing a given frequency component.

In this exemplary embodiment, the images used were 512×512 pixels. The images are two-dimensional (2D) so the Fourier Transform of the images is also 2D. The Fourier values can be complex numbers so they are squared to give the power spectrum, which is also 2D (real numbers). In this exemplary embodiment, the power spectrums along different slices of the image are averaged to compress the data from a 2D spectrum to a one-dimensional spectrum (1D). The slices were spaced 15 degrees apart, so there were N=360/15=20 slices in total. The power in this spectrum was then integrated over a specific band x (not over the entire spectrum) to further compress the 1D spectrum to a single number, the blur score. This band x can be referred to as the "power integration band". It was found though experimentation that integrating over a spatial frequency band of 10-50 cycles/image worked best. Blur scores go up slightly with wider bands as more raw image is included, but above 50 cycles/image the gain is small. Below 10 cycles/image the scores go down and performance is worse because the fine details in the image are filtered away. This band corresponds to 100-300 microns/cycle. This is the band x over which we integrate power in the blur score formula.

Figure 3:
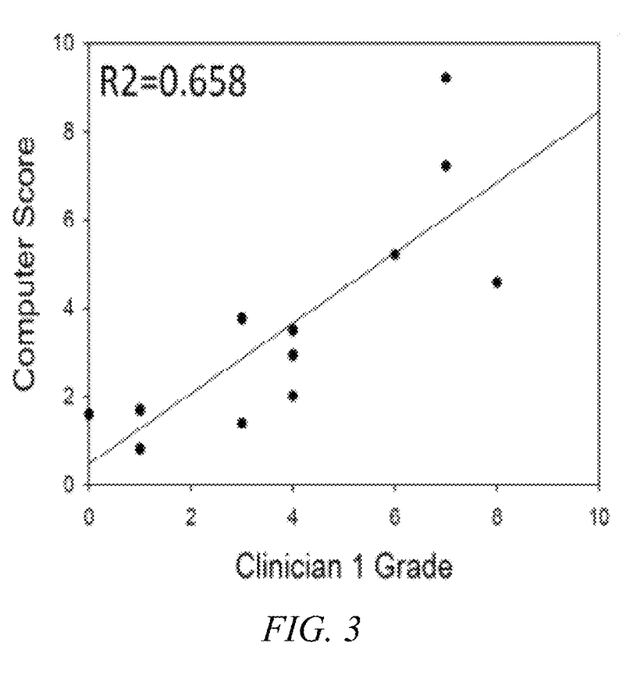
FIG. 3 is a plot of a trial set of 12 clinical fundoscopic images showing the scores generated using the invention against an expert clinician's grading of vitreous haze.

In this exemplary embodiment, the entropy image was calculated by taking a 32×32 pixel section of the image and calculating the entropy of the pixel values in that window, where entropy is a statistical measure of randomness that can be used to characterize the texture of the input image. Then the window was move over one pixel and the process was repeated for all pixels in the image. The window is the "entropy filter band" because the results will depend on its size. A smaller window will give different entropy-filtered difference image than a larger window. The optimal spatial band will cover the range of sizes of the retinal blood vessels in the image set.
Results In a first trial experiment, the dataset consisted of twelve TIFF digital fundus images. Each image depicts a single eye of a single patient with uveitis. Computer-scored results were compared in a masked fashion with the subjective readings of an expert clinician (BM). FIG. 3 shows the scores generated by the method outlined above plotted against an expert clinician's grading of vitreous haze in a trial set of twelve clinical fundoscopic images. The best-fit linear regression line was plotted using the following equation: y=0.8x+0.7, with the Pearson correlation coefficient of 0.81 ($R^2$=0.66).

Figure 4:
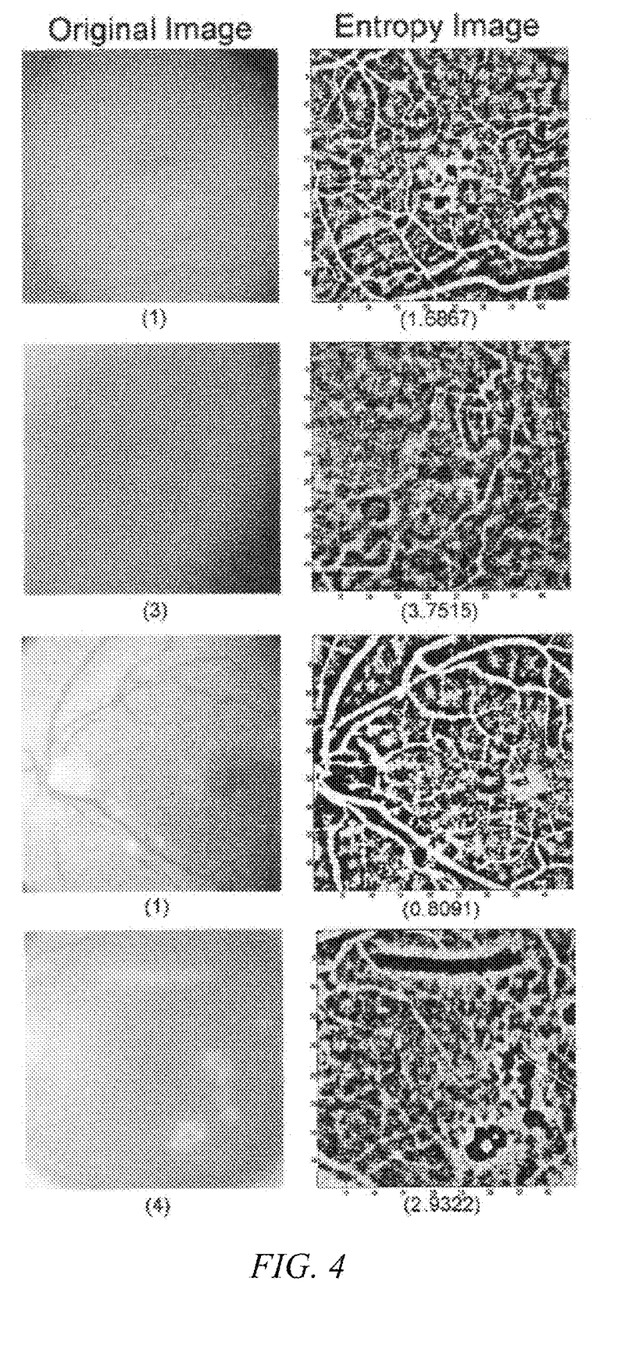
FIG. 4 is a set of four fundoscopic images from the trial set and four entropy images corresponding to the fundoscopic images.

In the clinical set, the algorithm was applied without modification to a dataset of 110 digital fundus images collected from patients with different grades of uveitis. FIG. 4 shows four of the 110 images from the clinical set next to their respective entropy images. The clinician's grade for each image is shown below the original image, and the computer-generated scores are shown in parenthesis below the corresponding entropy images. Computed scores of vitreous haze were compared in a masked fashion with the subjective readings of two expert clinicians. The Pearson correlation coefficient between computed scores and clinician grades of blurriness was 0.81-0.88 ($R^2$=0.66-0.78).

Figure 5A:
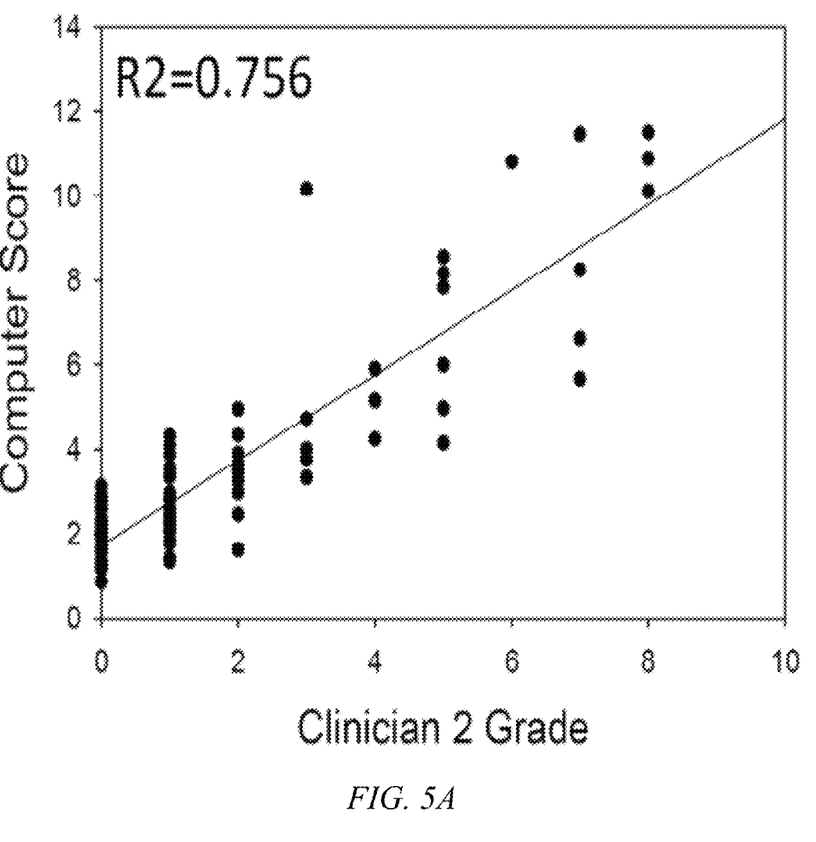
FIG. 5A is a graphical comparison of the present invention's computed blur scores with vitreous haze scores of a second expert grader for a set of 110 fundus images.
Figure 5B:
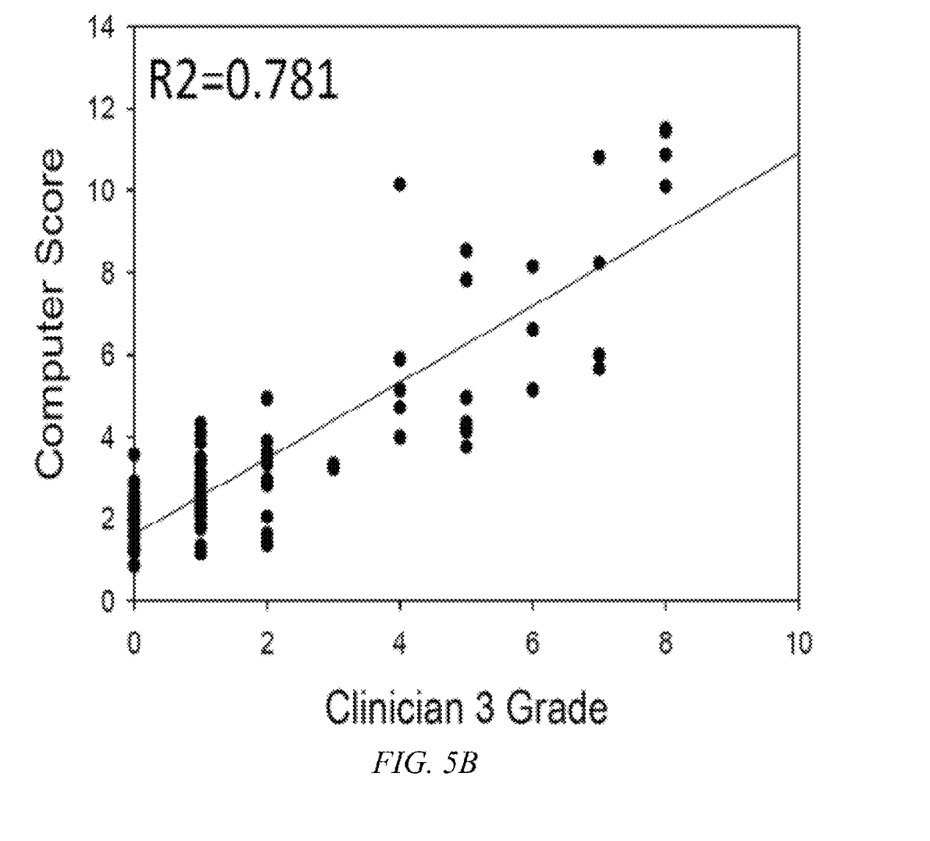
FIG. 5B is a graphical comparison of the present invention's computed blur scores with vitreous haze scores of a third expert grader for a set of 110 fundus images.
Figure 5C:
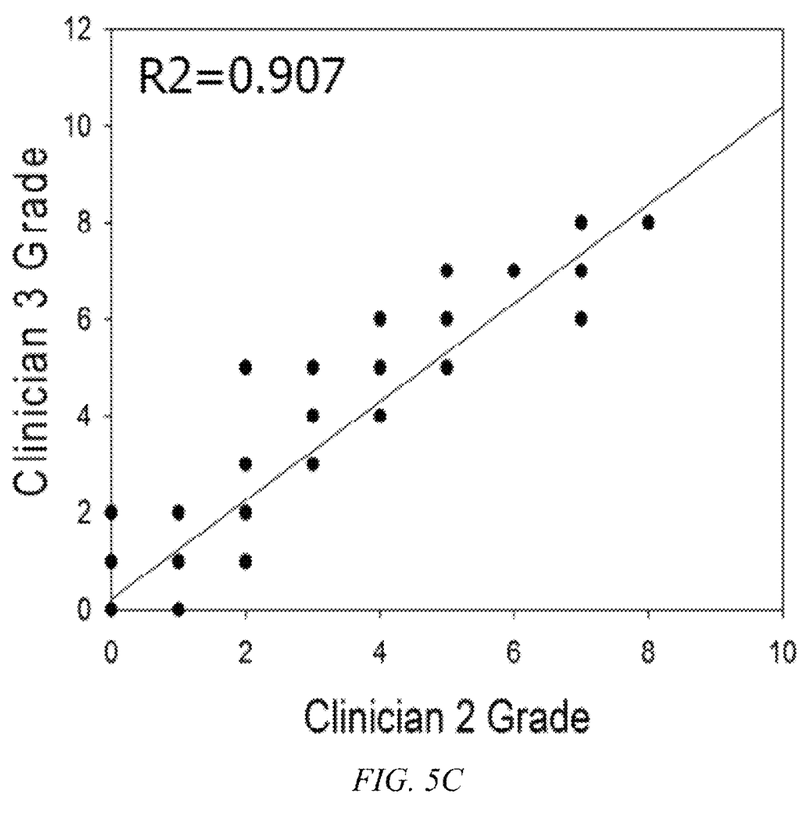
FIG. 5C is a comparison of vitreous haze scores of the two expert graders in FIG. 5A and FIG. 5B.

FIG. 5A provides a graphical comparison of the present invention's computed blur scores with vitreous haze scores of a second expert grader for a set of 110 fundus images. FIG. 5B is a graphical comparison of the present invention's computed blur scores with vitreous haze scores of a third expert grader for a set of 110 fundus images. FIG. 5C is a comparison of vitreous haze scores of the two expert graders in FIG. 5A and FIG. 5B. Solid lines are linear regression fits of the blur score data. The Coefficient of Determination ($R^2$) is provided above each plot in FIGS. 5A and 5B for the three computed scores. As illustrated in the graphs, the present invention provides an unbiased and quantitative grading of vitreous haze that correlates strongly with subjective readings of a certified expert clinician. Thus, the present invention offers a more efficient and effective method for grading vitreous haze.

Glossary of Claim Terms

Entropy Filter Band: is the spatial dimensions of the section of the image over which the probability p of pixel values in determined for entropy calculations, where entropy equals $-\Sigma p \cdot \log(p)$.

Fast Fourier Transform: is a mathematical process of representing an image in terms of frequency components with complex-valued coefficients.

Low Pass Filter: is a filter allowing low frequencies to pass through it.

Power Integration Band (x): is a filter band over which the power is integrated.

Power Spectrum: is the squared value of the Fourier Transform coefficients.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method for grading vitreous haze comprising the steps of:
   obtaining a fundoscopic image;
   converting the fundoscopic image to a gray-scale image;
   processing the gray-scale image through a low-pass filter to obtain a low-pass image by eliminating high frequency components;
   subtracting the low-pass image from the original image to produce a difference image;
   converting the difference image into an entropy image by applying an entropy filter band to the difference image wherein the entropy filter band filters a range encompassing the size of the retinal blood vessels in the image;
   calculating a power of the entropy image using Fast Fourier Transform; and
   calculating a blur score by averaging the power of the entropy image along a plurality of image slices.

2. The method of claim 1, wherein the step of applying the entropy filter band to the difference image includes applying the entropy filter band to a plurality of windows making up to the difference image.

3. The method of claim 1, wherein the power spectrum is integrated over a power integration band (x).

4. The method of claim 3, wherein the integration includes 10-50 cycles/image.

5. The method of claim 3, wherein the power integration band (x) filters 100-300 microns/cycle.

6. A computer implement method for grading vitreous haze comprising the steps of:
   obtaining a fundoscopic image;
   converting the fundoscopic image to a gray-scale image;
   processing the gray-scale image through a low-pass filter to obtain a low-pass image by eliminating high frequency components;
   subtracting the low-pass image from the original image to produce a difference image;
   converting the difference image into an entropy image by applying an entropy filter band to the difference image wherein the entropy filter band filters a range encompassing the size of the retinal blood vessels in the image;
   calculating a power of the entropy image using Fast Fourier Transform; and
   calculating a blur score by averaging the power of the entropy image along a plurality of image slices.

7. The method of claim 6, wherein the applying the entropy filter band to the difference image includes applying the entropy filter band to a plurality of windows making up to the difference image.

8. The method of claim 6, wherein the power spectrum is integrated over a power integration band (x).

9. The method of claim 6, wherein the integration includes 10-50 cycles/image.

10. The method of claim 6, wherein the power integration band (x) filters 100-300 microns/cycle.

* * * * *